June 23, 1936.  A. H. NEULAND  2,045,197

ELECTRIC SYSTEM, GEARING, AND CONTROL FOR MOTOR VEHICLES

Original Filed April 29, 1929  3 Sheets-Sheet 1

INVENTOR
Alfons H. Neuland

June 23, 1936.  A. H. NEULAND  2,045,197

ELECTRIC SYSTEM, GEARING, AND CONTROL FOR MOTOR VEHICLES

Original Filed April 29, 1929  3 Sheets-Sheet 2

INVENTOR
Alfons H. Neuland

Patented June 23, 1936

2,045,197

UNITED STATES PATENT OFFICE 2,045,197

ELECTRIC SYSTEM, GEARING AND CONTROL FOR MOTOR VEHICLES

Alfons H. Neuland, Irvington, N. J., assignor, by mesne assignments, to The Power Transmission Company, Incorporated, New York, N. Y., a corporation of Delaware Application April 29, 1929, Serial No. 359,031
Renewed January 6, 1936

66 Claims. (Cl. 172—239)

This invention relates to improved methods and means for transmitting power from a power source to a load, and is particularly adapted to motor vehicles.

One of the principal objects of the invention is to simplify and improve the control of motor vehicles and to provide an efficient and compact apparatus for accomplishing it.

Another object is to control engine and vehicle speed and torque relationships by variations of the engine throttle.

Another object is to provide an improved combination of gearing and electrical elements which permits the production of a powerful load torque efficiently and with relatively light weight electrical elements.

Still another object of the invention is to provide for a construction to save space and to maintain alignment with engine.

A further object is to provide for a magnetic circuit to reduce core losses.

Other objects are to vigorously crank the engine from a battery, to electrically decelerate the vehicle with the aid of engine friction and to provide relatively simple circuit connections, switches and control elements to accomplish these objects.

Still further objects and advantages of my system will appear from the following detailed description and a preferred embodiment shown in the accompanying drawings in which Fig. 1 is in part a longitudinal section and in part a side elevation of the transmission, showing its detailed construction and the method of driving from engine.

Figure 1:
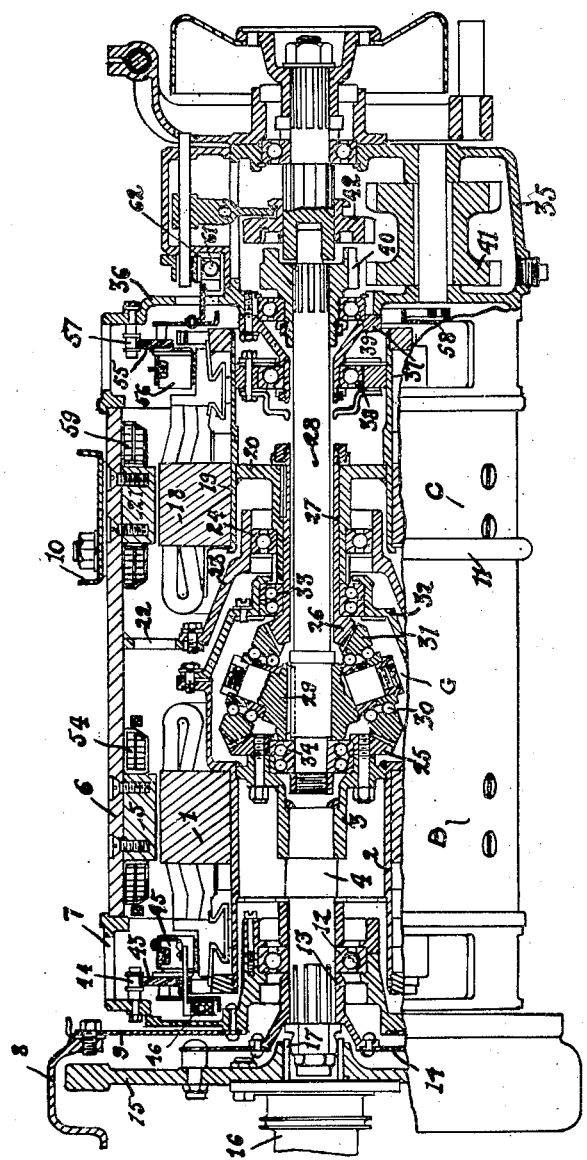

Referring to the figures, in which like numerals identify like elements, the transmission includes an electrical unit or dynamo B which will hereafter also be referred to as the booster, a second electrical unit or dynamo C, which hereafter will also be designated as the clutch, and a differential gear train G. The booster has an armature 1 assembled on a cylinder 2 secured to a spider 3 as by welding, which in turn is secured to the shaft 4. The booster is provided with pole pieces 5 secured to the field yoke 6 which also serves as the casing and incloses the greater part of the transmission. An end bell 7 is bolted to the casing and serves to align the front end of transmission with engine bell housing 8 thru the semi-flexible disk 9. The rear end of transmission is securely suspended from the vehicle cross member 10 by means of the strap 11. The shaft 4 is supported in the bell 7 by the ball bearing 12 and has a drive flange 13 splined to it. A semi-flexible disk 14 is interposed between flange 13 and the engine fly wheel 15 operative to transmit power to booster shaft 4 from engine shaft 16, concentricity between the shafts being maintained by the centering bearing 17. This construction permits the cross member 10 to carry the bulk of the transmission weight, and allows the vehicle frame to weave without spoiling the concentric alignment; it saves valuable space and facilitates installation or removal of the transmission as a unit.

The clutch unit comprises an armature 18 assembled on the cylindrical part 19 secured to the spider 20. Clutch pole pieces 21 are secured to the casing 6, also a ring 22, to which a bell 23 is bolted for supporting clutch armature by means of ball bearing 24.

The gear train includes a gear 25, bolted to spider 3 and which will hereafter be also referred to as the engine or power gear, and a gear 26 having a hollow extension or sleeve 27 keyed to the clutch armature spider 20; this gear will also be referred to as the clutch or balancing gear. I provide a propeller or load shaft 28 extending thru the sleeve 27 to which a spider 29 is keyed. Ball bearings 30 are secured to spider 29 and carry the intermediate or propeller gears 31 which will also be referred to as the load gears, preferably two or more in number arranged to directly engage with the engine and clutch gears. The expanded portion of cylinder 2 is provided with a flange to which the bell 32 is bolted so as to form a gear housing and tightly seal the gear lubricant within, the ball bearings 33 and 34 serving to hold the gears in rigid alignment with each other. It is of importance to enclose the gearing within a small space and this my gearing construction and combination accomplishes, enabling me to make use of the space within the end connection of the armature coils. I also provide ball races in the bodies of the intermediate gears and thereby secure additional saving of space. It will be seen that this gearing may be of the spiral bevel type, which in combination with their relatively small diameters, compact arrangement and rigid mounting makes quiet operation at high speed practicable.

I provide mechanical reversing gearing comprising a gear case 35 preferably integral with the bell housing 36. A part 37 bolted to bell 36 carries a bearing 38 for the purpose of supporting rear end of clutch armature. Another bearing 39 locked within bell 36 carries a pinion 40 splined to receive the end of propeller shaft 28. A double gear 41 engages with the pinion thru an idler (not shown) so that the sliding gear 42 may engage with pinion 40 for forward operation and with the double gear 41 for reverse operation.

Figure 2:
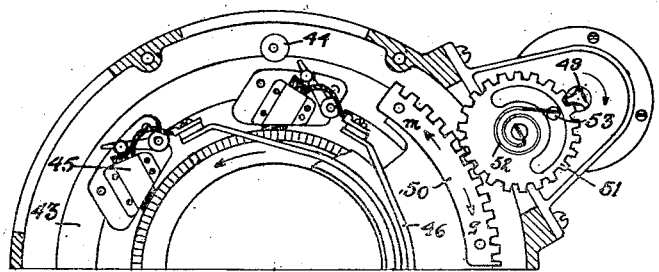
Fig. 2 is a partial cross section, showing the brush rigging and provision for shifting it.

Turning now to the control elements it will be seen from the drawings with special reference to Fig. 2 that I provide a brush rigging for the booster commutator that may be shifted over an arc of approximately 150 electrical degrees. It consists of a ring 43 carried by the rollers 44 to facilitate angular movement with little friction. Brushes 45 are secured to the ring and are provided with flexible leads 46 arranged to permit free movement of the brush rigging. In Patent No. 1,410,215 issued to A. H. Neuland on March 21, 1922, the present patentee has described a transmission apparatus wherein brush shifting is employed. However the apparatus therein described lacks, among other things, good commutation and requires skill for its operation. One object of the present invention is to provide a combination and arrangement of elements and windings to secure good commutation under all conditions and to establish cooperation between the load, engine and transmission for automatically meeting the requirements of vehicle operation.

Figure 4:
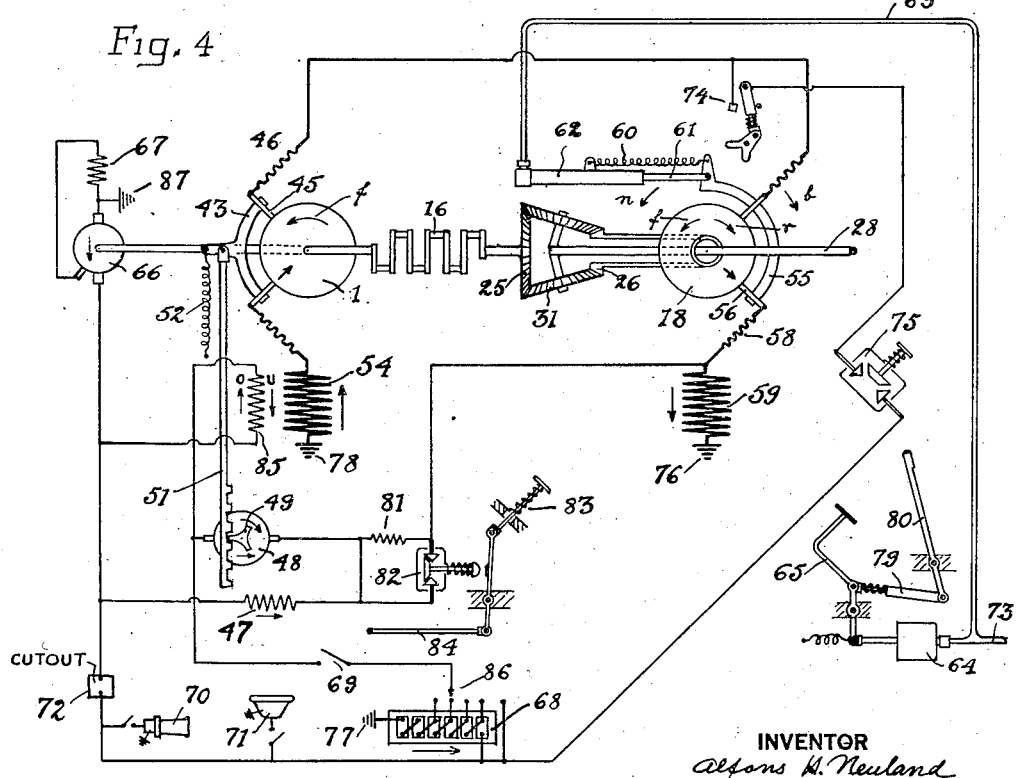
Fig. 4 is a diagram showing the electrical and mechanical connections and relationships between the system and the engine, propeller, accelerator and other devices on the vehicle.

I provide a brush shifting device for the booster which may conveniently take the form of a small motor having a field coil 47 Fig. 2 and Fig. 4 and an armature 48, a pinion 49 on the armature shaft imparts angular movement to the gear sector 50 and brush rigging thru the intermediate gear 51. The brush shifter when energized operates to move the brushes into generating position, that is towards arrow $g$ in opposition to engine rotation and the spring 52 is arranged to move the brushes in direction of engine rotation and arrow $m$ for motoring operation of booster when its tension exceeds the force exerted by the shifter. The stop 53 limits brush movement in either direction.

Figure 5:
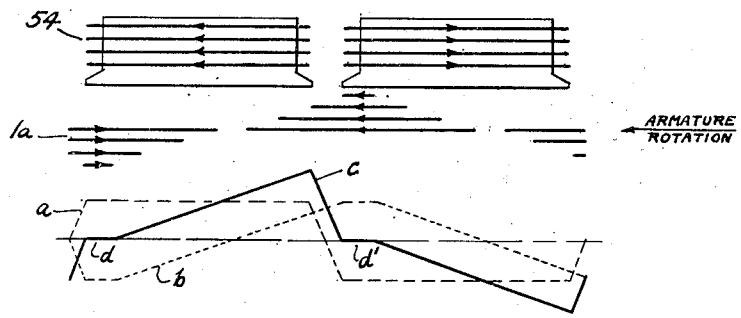
Figures 5, 6 and 7 show the resulting magnetomotive forces under the pole of the booster with the brushes in various positions.
Figure 6:
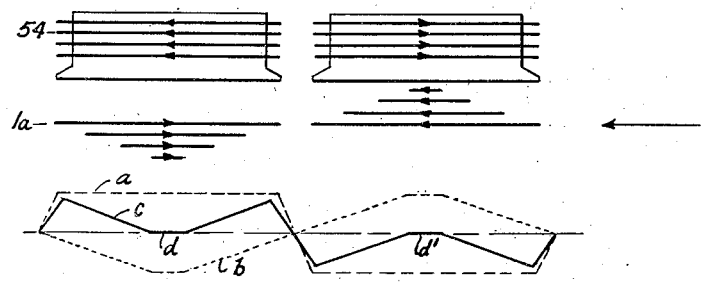
Figure 7:
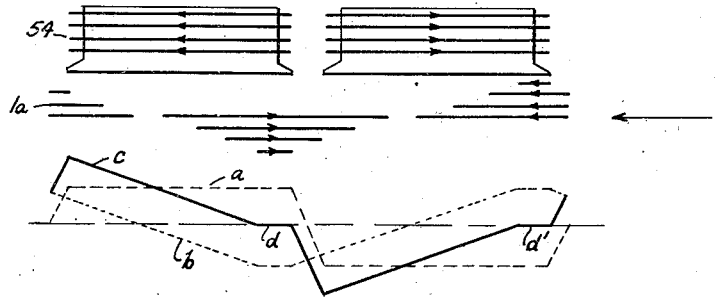

The booster field poles are provided with coils 54 connected in series with the booster armature in such direction that, with the brushes moved to motoring position $m$, the booster operates as a motor in the direction of engine rotation when current is established in the load circuit. The ampere turns of the field coils are so connected and proportioned with respect to the ampere turns of the armature winding that the magnetizing forces of the two windings oppose and substantially neutralize each other at the point where the armature winding is being commutated. In other words, a neutral zone, or a zone of substantially no flux, is produced at the commutation point, and this zone shifts with the shifting of the brushes, so that excessive short circuit currents, caused by the brushes bridging adjacent commutator bars, are effectively prevented over the entire range of shift of the brushes. This is illustrated in Figures 5, 6 and 7. If the coil 54, for instance, comprises four effective turns represented by the four heavy lines 54 on a pole piece, the armature winding is proportioned to form substantially four effective turns represented by the four heavy lines $1a$. The windings are connected so that the field winding 54 opposes the armature winding 1 as indicated by the arrows, producing the magnetomotive forces $a$ and $b$ respectively and the resultant magnetomotive force $c$. Figure 5 shows the magnitude of and the relationship between the magneto motive forces and the neutralized commutating zones $d$, $d'$ when the brushes are moved in the direction of engine rotation and have reached their extreme motoring position. Figure 6 shows the location of the commutating zones $d$, $d'$ when the brushes have moved to a point intermediate the motoring and generating positions, in which position the armature terminal voltage is zero. Figure 7 represents the condition when the brushes have moved into the extreme generating position. It will be seen that during the entire range of brush movement the peak of the armature magnetomotive force of one sign remains under its cooperating pole piece of opposite sign, thereby maintaining for all positions of the brush, within fixed limits, a neutralized zone for the coils undergoing commutation.

For purposes which will hereafter be more fully described I provide a shiftable brush rigging for the clutch comprising a ring, brushes, rollers and flexible leads 55, 56, 57 and 58 respectively, also a series field coil 59 proportioned and arranged as heretofore described in connection with booster to secure equally good commutation for the clutch. These clutch brushes are normally held in a position towards direction of engine rotation as indicated by arrow $n$ Fig. 4 by the spring 60. I provide means for overcoming the spring tension and shifting the brushes from their normal in a direction opposed to engine rotation and indicated by the arrow $b$. In the present embodiment I provide a piston or plunger 61, engaging with the brush rigging, slidingly arranged within the cylinder 62 and a pipe connection 63 to the master cylinder 64 operating the hydraulic vehicle brakes by means of the pedal 65.

The torque and speed relationships and cooperation between the engine, gearing and electrical units in my system and the advantages resulting therefrom may best be understood from the following: Rotation of propeller shaft is dependent on the relative speed and direction of rotation of engine and clutch and can be determined by the equation $$Ps = \left[Es\frac{Eg}{(Eg+Cg)}\right] \pm \left[Cs\frac{Cg}{(Eg+Cg)}\right]$$

where $Ps$ = propeller R. P. M.
$Es$ = engine R. P. M.
$Cs$ = clutch R. P. M.
$Eg$ = engine gear diameter
$Cg$ = clutch gear diameter The value in the last half of the equation is to be subtracted from that in first half when clutch rotates in opposition to engine, otherwise it is to be added. When the vehicle is stationary the engine may continue to rotate, merely driving the clutch in the opposite direction thru the gears 31 on the spider of the propeller shaft, or when the vehicle is in motion relative movement between the gears may cease if clutch rotates at engine speed and in the same direction.

The patentee is aware that transmission apparatus employing gearing have heretofore been proposed but these, to his knowledge, are complicated, produce opposing forces that render the apparatus inefficient or lack effective controlling means. In my system the propeller torque at stall is equal to the sum of the torques developed by the engine, clutch and booster and generally, with the exception hereafter described, is always equal to the sum of the engine gear and clutch gear torques. It will be seen that the clutch gear torque must equal that of the engine gear when the two gears are of the same diameter. Under this condition, when clutch and engine speeds are equal substantially one half of the engine power is directly transferred to the propeller shaft thru the engine gear and the other half must be converted into electrical energy in the booster and supplied to the clutch in order to balance the torque on the other side of the loosely journaled propeller gear. A practical motor vehicle transmission system must meet a multiplicity of requirements which include a powerful torque at start and a moderate engine speed under normal conditions. My system is well adapted to meet these in that it enables me to select the most favorable ratio between clutch and engine gears in combination with the relation between the size of clutch and booster units. A favorable arrangement results from the use of an engine gear having twice the diameter of the clutch gear and a booster twenty per cent larger than the clutch. As it is convenient to have the booster and clutch diameters as well as the numbers of their poles and windings identical the booster core length need only be varied with respect to clutch in order to establish a predetermined torque on load shaft in excess of power shaft torque. With such an arrangement, when engine and clutch rotate together, substantially two thirds of the engine power is directly transferred to the propeller, thru the engine gear, the booster transforming the remaining third into electrical energy and supplying it to clutch for balancing the engine gear torque. Inasmuch as the radius of clutch gear in this instance is only one half that of engine gear it need only supply one half the number of foot pounds to establish the necessary balance.

The general propeller torque equation is $$Pt = EGt \frac{(EGd + CGd)}{EGd}$$

where $Pt$ = propeller torque in foot pounds
$EGt$ = engine gear torque in foot pounds
$EGd$ = engine gear diameter
$CGd$ = clutch gear diameter If the gearing and electrical units are adequate to handle a given engine torque the maximum torque at the engine gear may be approximated with the equation $$EGt = Et \frac{Cl \frac{EGd}{CGd}}{\left[\left(Cl \frac{EGd}{CGd}\right) - Bl\right]}$$

where $EGt$ = engine gear torque in foot pounds
$Et$ = engine torque in foot pounds
$Bl$ = booster core length
$Cl$ = clutch core length $EGd$ = engine gear diameter
$CGd$ = clutch gear diameter The numerator in the last equation represents relatively the power of clutch, and the denominator the extent of the clutch power predominance over the booster. When the booster armature diameter differs from that of the clutch, their respective torque capacities may be substituted for $l$ in the equation. Accordingly the torque multiplication at the engine gear and therefore at the propeller shaft at stall depends on the relative power of booster with respect to clutch and is greatest when the power of booster is nearly equal to the clutch power provided the transmission is adequately proportioned and satisfies the following equation:

$$\frac{Et}{EGt} = \frac{\text{Total transmission loss}}{\text{Total clutch power}}$$

From the foregoing it is seen that the higher the ratio of the differential gearing the smaller the torque multiplication. To overcome this objection I provide a booster of relatively large torque capacity with respect to clutch torque capacity and thereby reduce the clutch power predominance and accomplish the desired large torque multiplication irrespective of the high ratio differential gearing. A further object of the combination is to drive the clutch armature at a speed exceeding the booster when the armatures rotate in the same direction and thereby still further increase the speed and torque range of the combination.

The circuit and control connections are shown in Fig. 4 in which the heavy line represents the load circuit comprising coils 54 and 59 and armatures 1 and 18 of the booster and clutch respectively. A small generator preferably of the third brush type usually carried on motor vehicles is made use of in my system to provide certain control features and will hereafter also be referred to as the regulator. It is represented by the armature 66 and field coil 67. A battery 68 on the vehicle may also be connected to my system by means of the switch 69. The battery supplies current to the vehicle devices such as the horn 70 and lights 71 and may be charged by the regulator when the cut out 72 closes.

I shall now describe the operation of the illustrated embodiment of my system. To start engine the brake pedal 65 is depressed applying the vehicle brakes (not shown) thru the tube 73. The pressure operates the plunger 61 and shifts the clutch brushes into direction of arrow $b$ simultaneously closing the switch 74. Depression of switch 75 then connects the battery, current flowing thru clutch armature and field and returning to battery thru the grounds 76 and 77. The clutch armature rotates in direction of arrow $r$, and thru the gear 31 spins the engine in direction of arrow $f$, the engine receiving double the clutch torque in the case of a 2—1 gear ratio. Another circuit is established thru the armature and field of booster, the current returning to battery by way of the grounds 78 and 77. The booster brushes are at this time held in motoring position by the spring 52 and so permit the booster to supply an additional torque for cranking the engine. Owing to the gear ratio and unequal clutch and booster speeds resulting therefrom the independence of the electric and magnetic circuits in the two units permits each to operate to the best advantage, the clutch supplying the bulk of the cranking torque at start and the booster maintaining a substantial cranking speed. While the brake pedal remains fully depressed the engine may be run without building up current in the load circuit or applying torque to the propeller. In order that the operator may leave the wheel to make adjustments or for other reasons I provide a connection 79 between the emergency lever 80 and pedal 65 whereby the latter may be kept depressed when the lever 80 is set.

To apply torque to propeller the pedal 65 is brought to its normal position and the switch 69 closed, sending a small current thru the brush shifter armature 48 which traverses the resistance 81, or the accelerator switch 82 when closed, returning to the battery by way of the coil 59 and grounds 76 and 77. As long as engine rotates at idling speed no current flows in the brush shifter field coil 47 as the regulator armature to which it is connected has not built up sufficient voltage at this low speed. Lacking a field, the brush shifter is incapable of producing a torque so that the spring 52 holds the booster brushes in motoring position. It should be noted that the correct proportioning of the gearing and relative size of clutch and booster units is important and assuming the aforesaid relationshps of a 2-1 ratio differential gearing and a booster 20 per cent larger than clutch the potential of clutch with respect to booster at stall will be as 5 to 3 giving the clutch adequate predominance over booster and providing a potential component to satisfy the resistance of the load circuit. The battery cranking current traversing clutch field coil 59 has left a residual magnetism in the field poles which is strengthened by the relatively small current from the battery flowing thru coil 59 and which, in cooperation with the clutch predominance and rotation in opposition to engine causes the clutch to build up as a generator when the accelerator 83 is depressed. Depression of accelerator opens engine throttle (not shown) by means of the rod 84 and increases engine speed. Whenever the vehicle is stalled my system will develop its maximum predetermined torque by merely depressing the accelerator, the engine speeding up the clutch armature in the opposite direction to a point where the predominating component of clutch voltage balances the voltage consumed by the resistance of the load circuit when the maximum predetermined current flows in the circuit and the full power developed by the engine at this speed equals the losses in the transmission. The exact engine speed at this time depends upon the constants of the transmission and is usually about 500 to 600 R. P. M. It is held at such speed as long as the car remains stalled and consequently is able to develop its full torque. The booster brushes at this stage of operation remain in the motoring position even though the regulator armature 66 has partially built up at this speed. This is due to my circuit connections whereby the considerable voltage drop in the coil 59 at this moment of heavy load current opposes that developed by the regulator and battery and so limits the current in coil 47 and armature 48. Consequently the booster contributes a powerful torque to the propeller thru the engine gear, the clutch supplying another component sufficient to balance that of engine gear—assuming the following relationships:

$EGd$—2
$CGd$—1
$Bl$—1.2
$Cl$—1.0
$Et$—1 then maximum engine gear torque at stall is $$EGt = 1\frac{1\frac{2}{1}}{\left[\left(1\frac{2}{1}\right)-1.2\right]} = 2.5$$

of which 1 is supplied by engine and 1.5 by the booster. The maximum propeller torque is then $$Pt = 2.5\frac{2+1}{2} = 3.75$$

the clutch having to supply the difference of 1.25 of this torque. From the foregoing it is seen that with my system this great multiplication of engine torque can be obtained with electrical units of moderate size. The clutch need only be proportioned to produce 1.25 engine torque and the booster 1.5. It will also be noted that the torque relationship between the two units is the same as their relative size. This permits the brushes of both units to be in similar, and most favorable, positions and operation with powerful fields, made possible by the series field coils and the good commutation resulting from neutralization heretofore described; all of which substantially improves the electrical and weight efficiencies of the apparatus. It is often desirable to change the maximum torque of the transmission after it has been installed. This may be done in my system by simply adjusting the stop of the clutch or booster brushes so as to bring them under the pole.

As the vehicle starts, the engine automatically speeds up and the regulator armature 66 builds up its full voltage. The load current in coil 59 simultaneously decreases as does the opposing potential drop therein, the battery sending an increased current thru armature 48, and the regulator energizing the field coil 47. The brush shifter now overcomes the tension of spring 52 and gradually moves the booster brushes under the pole, thus decreasing booster counter potential. This decreases its motoring action and forces the clutch armature to slow down and also prevents engine from speeding up at too great a rate. As the vehicle speed continues to increase, load current and voltage drop in coil 59 also decrease, the brush shifter moving the brushes past the center of the poles whereupon booster becomes a generator, takes over energization of the circuit and thereafter supplies the clutch with energy. The clutch armature responds to the changes in the magnitude and direction of the booster potential, comes to a stop and thereafter speeds up in the direction of engine rotation. In this connection it should be noted that the transition takes place gradually and without interruption of torque on the propeller, the units changing from generator to motor and vice versa with current in load circuit continuing in the same direction during all stages of operation. As the vehicle accelerates, the generator action of the clutch decreases, but the booster begins to act as a generator before the clutch armature comes to a stop. Accordingly, for a given engine speed, there will be a range of vehicle speed in which both dynamos act as generators to maintain current in the load circuit. This results in effective use of the engine power and rapid acceleration of the vehicle.

After the vehicle has accelerated, only a fraction of the engine power is required to maintain its normal speed so that the accelerator may be partly released. Release of accelerator decreases current and opposed drop voltage in coil 59, the booster brushes immediately moving into position of maximum booster generation in response to the reduced torque on the load shaft. The clutch armature speeds up and reaches engine speed at which time there is no relative motion in the gearing. In the instance cited where the size of booster exceeds clutch in the ratio of 1.2 to 1.0 the booster voltage exceeds clutch counter voltage sufficiently to permit a substantial current in load circuit and load on propeller. When the load is light and the excess potential is not all consumed in the load circuit, the clutch armature will rotate faster than booster causing propeller shaft to overspeed engine.

Examining the division of power in my system during the stage when engine, clutch and propeller rotate at equal speeds it is seen that, disregarding losses, the propeller torque is equal to engine torque but as heretofore described the propeller receives the sum of engine gear and clutch gear torques, and as these are dependent on the gear ratio, the component the engine gear supplies is equal to $$EGt = Pt\frac{EGd}{(EGd + CGd)} = \frac{2}{3}$$

therefore two thirds of the engine power is directly transferred to the propeller shaft and the booster is only required to convert one third of the engine power into electrical energy in order that the clutch may produce the torque component to balance that of engine gear.

The vehicle may be brought to a sudden stop without the danger of stalling the engine for the reason that when accelerator is released, engine slows down to an idling speed, potential of regulator and current in coil 47 decrease to the point where the spring 52 shifts the booster brushes into motoring position and automatically stops the flow of power to propeller. Even though the clutch armature now rotates in generating direction, its predominance over booster is insufficient to build up any considerable current at this relatively low engine speed.

If the vehicle is to be accelerated moderately, a slight depression of accelerator suffices to speed up engine, and, as the propeller and engine torques, the load current and opposing potential in coil 59 are now small, the relatively strong current in brush shifter quickly moves the booster brushes into full generating position, as a result of which the engine operates economically and at a relatively low speed with respect to propeller whenever the load is light, thereby conserving fuel and engine life.

In addition to the self regulation above described I provide a resistance 81 in the brush shifter circuit which may be included or excluded therefrom by the switch 82 for the purpose of independently controlling the shifting of the booster brushes. In the illustrated embodiment the switch 82 is preferably arranged to be operated by movement of the accelerator or throttle mechanism and so adjusted that the throttle may substantially be opened before a further depression opens the switch and includes the resistance. This weakens the brush shifter with respect to spring 52 so that the booster brushes assume a position that permits the engine speed to increase at any stage of operation (except stall) releasing an added component of engine power to be transformed into increased torque at propeller for the purpose of providing the vehicle with extraordinary flexibility and reserve power, for an emergency, which may instantaneously be released.

From the foregoing it will be seen that with my system the control of vehicle and engine is accomplished by merely variously depressing the accelerator. Power may be applied or interrupted, the engine ordinarily operated at low speed, the full engine torque may be applied under normal conditions without racing engine, and the maximum engine power may be released at will in an emergency. Requiring no skill for its operation it is safe in the hands of an operator not familiar with electrical devices.

I take advantage of the great torque ability of my system by the use of a moderate gear ratio in the rear axle of the vehicle as for instance 3.75—1 which in combination with the transmission constants above assumed makes a suitable ratio and meets the modern demand for high vehicle and economical engine speed. Such ratio is made possible by the ability of transmission to instantaneously increase propeller torque beyond engine torque as above described.

It is important at all times to have the current in load circuit flow in the same predetermined direction so as to maintain regulation relationship between coil 59, regulator 66 and battery 68. For this purpose I provide a teaser or stabilizing coil 85 having one end connected to regulator generator armature 66 and the other to the battery, preferably to a point 86 intermediate between the battery terminals during normal forward operation, operative to send a small current from battery thru teaser coil 85 in direction of arrow $u$ when the engine idles and the booster brushes are in motoring position substantially unopposed by the regulator 66 at this low speed and returning thru the ground 87 to the battery ground 77. This slightly magnetizes the booster poles and aids clutch at start in building load current up in direction of arrows. Just as soon as the load current builds up, the booster generating action ceases as even a small load current immediately reverses booster field and produces motoring action, the purpose of the teaser coil being to reverse the residual magnetism every time load current ceases or threatens to reverse and thereby insure its reestablishment in the same direction. As the vehicle and engine speed up the opposing regulator potential increases, current in coil 85 first decreases, and then as regulator potential becomes predominant over the battery cells in the circuit, reverses and flows in direction of arrow $o$. The booster brushes have simultaneously moved into generating position, the action of the teaser current in this stage being to maintain residual magnetism when load current ceases and prevent the clutch armature, whose potential is now opposed to load current, from weakening the booster residual magnetism or even reversing it. The teaser coil and armature 48 leads may conveniently be joined together as shown in Fig. 4 to be closed by the single switch 69. By the means described, whenever the accelerator is depressed, power to the propeller is applied smoothly and without shock and stability is constantly preserved. Other means may be used for stabilizing or teasing such as are shown in my co-pending application Serial No. 508,094 filed January 12, 1932.

My system also provides means for limiting the speed of vehicle when descending a grade and for decelerating it. This is accomplished by releasing accelerator, thereby permitting booster brushes to move into motoring position, and gradually depressing pedal 65. As described in connection with engine cranking this depression shifts clutch brushes past the center of poles and causes the now forwardly rotating clutch armature to generate and send a current thru load circuit in the same direction as during other conditions of operation, the transmission gearing reacting to speed up engine. The booster, by reason of its motoring action at this moment aids in rotating engine and thereby prevents shock to gearing and other elements in case of excessive depression of brake lever, the power of inertia being consumed in engine friction. As engine speeds up, booster brushes automatically move toward center of pole, the decreasing booster counter potential continues to increase engine speed and increasingly retard the vehicle. As the engine speed increases, the booster brushes may move into generating position, and, as the clutch brushes are held in generating position by the pedal 65, both dynamos operate as generators. As heretofore described in other stages of operation the voltage drop in coil 59 now (during braking operation) cooperates with the regulator and battery potentials to limit current in load circuit for the reason that a strong load current causes booster brushes to move in direction of greatest motoring action, increasing the booster counter potential and decreasing load current. Since the clutch potential is gradually varied by changing the position of its brushes thru the lever 65, the desired braking action may safely be secured at any vehicle speed. This ability of my system provides an effective service brake and conserves the life of brake linings as these need come into action only to bring the vehicle to a complete stop or in an emergency, when the brake lever is depressed all the way. It might be noted that due to the moderate tension of spring 60 the clutch brushes may be manipulated by only a slight pressure upon the brake lever which must be noticeably increased before the hydraulic vehicle brakes become effective.

My system further provides for electrically reversing the vehicle and will produce a fair reverse torque for ordinary conditions which is also accomplished by shifting the clutch brushes into an intermediate position past the pole center. A slight depression of accelerator now speeds up engine and brings booster brushes into full generating position. So long as clutch brushes are held in a position where their potential is inferior to booster, clutch armature operates as motor in reverse direction and thru the gearing causes propeller shaft also to rotate in reverse direction. This feature is convenient for maneuvering the vehicle into a small space as it permits a quick change from one direction to the other by movement of the lever 65 and shifting of clutch brushes from one side of pole center to the other.

It will be noted that the operation of the brush shifting motor may be independently controlled by either switch 82 or variable tap 86. In other words, the standard of operation of the brush shifting mechanism may be changed or controlled at will either by switch 82 or by variable tap 86.

Figure 3:
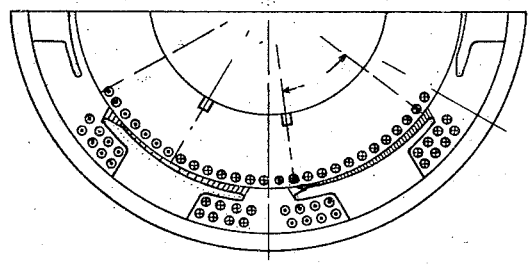
Fig. 3 is a partial outline of the magnetic circuits.

The great power needed to operate vehicles at maximum speed require their engines to rotate at high revolutions. In electrical apparatus high speeds ordinarily cause a considerable core loss in the magnetic material. In my system I provide means for substantially reducing the core losses by providing excentric pole arcs with respect to armature surface, as shown in Fig. 3, to form air gaps which vary circumferentially under the pole. I further arrange the clutch poles so that the air gap diminishes and the booster poles so that their air gap increases in the direction of engine rotation. At high speed, with clutch brushes in normal position and booster brushes in generating position, by this means I obtain a uniform flux distribution under the pole and a minimum flux density in the armature teeth for a given flux per pole. This reduces core losses and permits the use of multipolar electrical units with their attendant weight economy.

In Figure 3, I have shown to the right of the vertical center line, the current relations in the field and armature windings where the booster brush is set in full generating position and the flux is uniformly distributed under the pole face. To the left of the vertical center line I have shown the current relations between the field and armature windings when the brush occupies the neutral position midway between generating and motoring operation, and it will be seen that the air gap flux is neutralized in the commutating zone.

While I have herein shown a complete system embodying my invention and described its operation in connection with a motor vehicle, I desire to have it understood that my invention is adapted for other uses and that it may be used in whole or in part, depending upon the requirements to be met, in the described or other embodiments within the principle and scope of my invention.

Having described my invention I claim and desire to secure by Letters Patent:

1. In combination, a power shaft, a load shaft, a power dynamo operatively connected with the power shaft, a second power dynamo, a differential gearing connected with the shafts and with the second dynamo and means including electric connectors between the dynamos and, a variable speed auxiliary dynamo rotatively connected with one of the shafts for operating the first dynamo as a motor when the speed of the auxiliary dynamo is relatively low and for operating the first dynamo as a generator when the speed of the auxiliary dynamo is relatively high.

2. In a transmission the combination of a dynamo casing, a hollow armature, a second hollow armature disposed within said casing having a magnetic circuit independent of the first armature, antifriction bearings for the armatures arranged within the hollow armatures, gearing arranged between the armatures and within one of the hollow armatures, and a rotatable housing for enclosing said gearing.

3. In a transmission system, the combination of a power shaft, a power gear secured to the power shaft, a housing surrounding said gear and having one of its ends secured to the power shaft to rotate with the power shaft and with said gear, a load shaft extending into said housing, a thrust bearing adapted to prevent axial movement between the shafts, a clutch gear within the housing, a second thrust bearing to prevent axial movement between the clutch gear and the housing, a load gear meshing with both said gears arranged to be carried by the load shaft and to rotate on an axis differing from that of the load shaft, a dynamo having one of its elements secured to the clutch gear to rotate therewith, and means for varying the speed of the dynamo element.

4. In combination, a power shaft, a load shaft, a transmission casing, a dynamo armature, a sleeve including a hollow dynamo gear arranged within the dynamo armature and connected therewith, means for alining the armature with the casing, a power gear secured to the power shaft, a housing enclosing said gears and secured to the power shaft to rotate therewith, a load shaft extending thru the dynamo gear, a load gear carried by the load shaft and arranged to rotate on an axis differing from that of the load shaft, means for holding the load gear in mesh with the power and dynamo gears and a second armature operatively connected with the power shaft and electrically connected with the first armature.

5. In a transmission system, a power shaft, a load shaft, two electrically connected armatures for transmitting power between the shafts, a pole piece facing one of the armatures adapted to form an eccentric air gap over the major portion of pole face which increases in the direction of power shaft rotation, and a pole piece facing the other armature adapted to form an eccentric air gap over the major portion of pole face which decreases in the direction of power shaft rotation.

6. In a transmission system, the combination of a power shaft, a load shaft, a differential gearing connected with both shafts, a dynamo connected with the power shaft having a stationary element, a second dynamo having a rotatable element connected with the differential gearing and cooperating with the first dynamo to transmit power between the shafts, and means responsive to variations in the speed of one of the shafts for reversing the rotation of the rotatable element with respect to the stationary element.

7. In a transmission system, the combination of a power shaft, a load shaft, a differential gearing connected with both shafts, a dynamo connected with the power shaft, having a stationary element, a second dynamo having a rotatable element connected with the differential gearing to transmit power between the shafts and electrically connected with the first dynamo to form a load circuit, and means responsive to variations of current in the load circuit for reversing the rotation of the rotatable element with respect to the stationary element.

8. In a transmission system, the combination of a power shaft, a load shaft, a differential gearing connected in fixed speed relation with both shafts, a dynamo connected with the power shaft and having a stationary element, a second dynamo having a rotatable element connected with the differential gearing to transmit power between the shafts and electrically connected with the first dynamo to form a load circuit, and means responsive to variations in the speed of one of the shafts and to variations of current in the load circuit for varying the rotation of the rotatable element with respect to the stationary element.

9. In combination, a power shaft, a load shaft, a dynamo connected in fixed speed relation with the power shaft having a field element, a differential gearing connected with the shafts, a reversible dynamo including a field element and having an armature connected with the differential gearing, an auxiliary dynamo connected with one of the shafts, means including electric connections for varying the speed of one shaft with respect to the speed of the other shaft in response to variations in the speed of the auxiliary dynamo, and a battery for energizing one of the field elements.

10. In a transmission system, the combination of a power shaft, a load shaft, two electrically interconnected dynamos for transmitting power between the shafts provided with brushes, and brush shifting means responsive to variations in the speed of one of the shafts for varying the speed of one shaft with respect to the speed of the other shaft.

11. In a transmission system, the combination of a power shaft, a load shaft, two electrically interconnected dynamos for transmitting power between the shafts provided with brushes and forming a load circuit, and means responsive to variations of current in the load circuit for shifting the brushes of one of the dynamos.

12. In a transmission system, the combination of a power shaft, a load shaft, two electrically interconnected dynamos for transmitting power between the shafts provided with brushes and forming a load circuit, and means responsive to variations in the speed of one of the shafts and further responsive to variations of current in the load circuit for shifting the brushes of one of the dynamos.

13. In a transmission system, the combination of a power shaft, a load shaft, a dynamo connected with one of the shafts having brushes, a second dynamo connected with the other shaft and electrically connected with the first dynamo for transmitting power between the shafts, means for producing a variable force operative to shift the brushes in one direction, means for producing a second variable force operative to shift the brushes in the opposite direction and to variously balance the first force, and means for varying the strength of one force with respect to the strength of the other force operative to shift the brushes to various positions corresponding to the balanced strength of the forces.

14. In a transmission system, the combination of a power shaft, a load shaft, a dynamo connected with one of the shafts having shiftable brushes, a second dynamo connected with the other shaft and electrically connected with the first dynamo for transmitting power between the shafts, retractile means developing a force operative to shift the brushes in the direction of power shaft rotation for decreasing the speed of load shaft with respect to the speed of the power shaft, an electromagnetic brush shifter developing a force in opposition to that developed by the retractile means and operative to shift the brushes in opposition to power shaft rotation for increasing the speed of load shaft with respect to the speed of the power shaft, and means for varying the force developed by the electromagnetic brush shifter operative to shift the brushes to various positions and to vary the speed of one shaft with respect to the speed of the other shaft.

15. In a transmission system, a power shaft, a load shaft, a dynamo connected with one of the shafts having a stationary field element, a second dynamo connected with both shafts having brushes adapted to be shifted and a magnetic circuit independent of the first dynamo, a load circuit including the dynamos, retractile means for shifting the brushes in direction of power shaft rotation for applying power to load shaft and for driving load shaft in direction of power shaft rotation, and additional means for shifting the brushes in direction opposite to power shaft rotation for interrupting power flow to load shaft.

16. In combination, a power shaft, a load shaft, a reversible dynamo having an armature and a field element, a second dynamo connected with the power shaft having a field element, a load circuit including the dynamos, a differential gearing connected with the shafts and with the armature, means including a battery an auxiliary dynamo connected with one of the shafts, operative to maintain a slight magnetization in one of the field elements when load current ceases during rotation of the armature in one direction, and operative to maintain a slight magnetization in the same field element when load current ceases during rotation of the armature in the other direction.

17. In combination, a transmission casing a rotatable armature having a gear housing, a second armature electrically connected with the first armature, a differential gearing arranged within the gear housing and connected with one of the armatures, a power shaft connected with the other armature and with the differential gearing, a load shaft connected with the differential gearing, and means including an antifriction bearing for aligning the gear housing with the transmission casing.

18. In combination, a transmission casing, a power shaft, a load shaft, a dynamo armature within the casing, a differential gearing connected with the shafts and with the armature, a lubricant for the differential gearing, a rotatable multipart gear housing arranged to enclose the gearing and lubricant having one of its parts secured to one of the shafts and another part provided with an antifriction bearing for aligning the armature with the gear housing, and means for tightly locking the parts of the gear housing with one another.

19. In combination, a transmission casing, a power shaft, a load shaft, a dynamo armature within the casing, a differential gearing connected with the shafts and with the armature, a lubricant for the differential gearing, a rotatable multipart gear housing arranged to enclose the gearing and lubricant having one of its parts secured to one of the shafts and another part provided with an antifriction bearing for aligning the armature with the gear housing, means for tightly locking the parts of the gear housing with one another and an antifriction bearing arranged between the gear housing and the armature for aligning the gear housing and the armature with the transmission casing.

20. In combination, a transmission casing, a differential gearing, a gear housing arranged within the transmission casing for enclosing the gearing, a power shaft connected with the differential gearing and with the gear housing, an armature within the casing connected with the differential gearing, means including an antifriction bearing arranged between the armature and the gear housing for aligning one end of the armature and one end of the gear housing with the transmission casing, a load shaft extending thru the armature having one end connected with the differential gearing, and means including an antifriction bearing for aligning the free end of the armature and of the load shaft with the transmission casing.

21. In combination, a transmission casing, a differential gearing, a gear housing for enclosing the gearing, a power shaft secured to the gear housing and connected with the gearing, an armature arranged within the casing and connected with the gearing, means including an antifriction bearing arranged between the armature and gear housing for aligning one end of the armature and one end of the gear housing with the transmission casing, a load shaft extending thru the armature and having one of its ends connected with the gearing and the other end provided with driving means, a gear box adapted to be secured to the transmission casing including a gear adapted to slidingly engage with the driving means on the load shaft when gear box is joined with the transmission casing, and means including an antifriction bearing for aligning the free end of the armature and of the load shaft with the gear box.

22. In a transmission system, the combination of a power shaft, a load shaft, a generator connected with the power shaft having brushes adapted to be shifted, a motor connected with the load shaft and electrically connected with the generator to transmit power between the shafts, and brush shifting means responsive to variations in the speed of one of the shafts operative to shift the brushes in direction of power shaft rotation for driving the load shaft at a relatively low speed with respect to power shaft and to shift the brushes in the opposite direction for increasing the speed of the load shaft.

23. In combination, a power shaft, a load shaft, a generator having an armature and a field element, a motor connected with the power shaft having a field element, a load circuit including the generator and motor, a differential gearing connected with the shafts and with the generator armature, and means including a source of current for opposing the motoring magnetization in the motor field element and for aiding the generating magnetization in the generator field element when load current approaches zero operative to build up load current in a predetermined direction.

24. In combination, a power shaft, a load shaft, a dynamo connected in fixed speed relation with the power shaft having a field element, a second dynamo having an armature electrically connected with the first dynamo to form a load circuit, a differential gearing connected with the shafts and with the armature means for operating said first dynamo as a motor in one stage and as a generator in another stage, and means including a source of current for opposing the motoring magnetization in the field element in the said one stage, and for aiding the generating magnetization in the field element in the said other stage operative to build up load current in load circuit in a predetermined direction during rotation of the armature in one direction in the said one stage and during rotation of the armature in the other direction in the said other stage.

25. The means for operating a load shaft in forward and reverse directions with respect to a power shaft which includes a power shaft, a load shaft, a dynamo connected with the power shaft having a stationary field element and brushes adapted to be shifted, a second dynamo connected with both shafts having brushes adapted to be shifted and a magnetic circuit independent of the first dynamo, a load circuit including the dynamos, means for shifting the brushes of the second dynamo in one direction for forward operation of load shaft and in the opposite direction for reverse operation of load shaft and separate brush shifting means for the first dynamo responsive to variations in the speed of the power shaft for changing the speed and torque relationship between the shafts.

26. In combination, a power shaft, a load shaft, a power dynamo operatively connected in fixed speed relation with the power shaft, a second power dynamo, a differential gearing connected with the shafts and with the second dynamo, electric connections between the dynamos, a variable speed auxiliary dynamo rotatively connected in fixed speed relation with one of the shafts, and means including the auxiliary dynamo responsive to changes in the speed of the auxiliary dynamo for operating the first dynamo as a motor when the speed of the auxiliary dynamo is relatively low and for operating the first dynamo as a generator when the speed of the auxiliary dynamo is relatively high.

27. In a transmission system, the combination of a power shaft, a load shaft, a differential gearing connected with both shafts, a dynamo connected with the power shaft in fixed speed relation thereto and having a stationary element, a second dynamo having a rotatable element connected with the differential gearing and cooperating with the first dynamo to transmit power between the shafts, and means including a generator connected in fixed speed relation with and responsive to variations in the speed of one of the shafts for reversing the rotation of the rotatable element with respect to the stationary element.

28. In a transmission system, the combination of a power shaft, a load shaft, a differential gearing connected with both shafts, a dynamo connected with the power shaft in fixed speed relation thereto and having a stationary element, a second dynamo having a rotatable element connected with the differential gearing adapted to transmit power between the shafts and electrically connected with the first dynamo to form a load circuit, and means responsive to variations in the speed of one of the shafts and to variations of current in the load circuit for reversing the rotation of the rotatable element with respect to the stationary element.

29. In combination, a transmission casing, a rotatable armature having a gear housing, a second armature electrically connected with the first armature, a differential gearing arranged within the gear housing and connected with one of the armatures, a power shaft secured to the other armature and connected with the differential gearing, a load shaft connected with the differential gearing, and means including an anti-friction bearing for aligning the gear housing with the transmission casing.

30. In combination, a power shaft, a transmission casing, a differential gearing having a power gear a balancing gear and a plurality of intermediate load gears meshing with the power and balancing gears, means including a gear housing secured to the power shaft for tightly enclosing the gearing, a balancing device comprising a dynamo having an armature arranged within the casing and connected with the balancing gear, means including an anti-friction bearing arranged between the armature and the gear housing for aligning one end of the armature and one end of the gear housing with the transmission casing, a load shaft extending thru the armature having one end connected with said plurality of load gears, and means including an anti-friction bearing for aligning the free end of the armature and of the load shaft with the transmission casing.

31. Apparatus for transmitting power including an engine member, a load member, a plurality of separate dynamos, differential gearing connecting said members and said dynamos, one of said dynamos having a field element, and stabilizing means including a separate source supplying a minor current for reversing the residual magnetism in said field element when the transmission of power in said apparatus ceases.

32. Apparatus for transmitting power including an engine member, a load member, two separate dynamos having field elements and having armatures and field windings all connected in series load circuit relation, gearing connecting said members and said dynamos, one of said dynamos having a separate field winding on its field element, and means including a separate source supplying a minor current to said separate field winding for reversing the magnetomotive force in said field element when current in said load circuit ceases.

33. Apparatus for transmitting power including an engine member, a load member, a dynamo connected in fixed speed relation with the engine member having an armature and a field coil, a second dynamo having an armature and a field coil, a differential gearing connecting the second dynamo in varying speed relation with said engine member and said load member, means including both armatures and both field coils all connected in series load circuit relation for operating said first dynamo as a motor generating a potential opposed to the potential of the second dynamo, and means including a separate source supplying a minor current for reducing the residual magnetism and opposing potential in the first dynamo for aiding the second dynamo to build up current in said load circuit.

34. The means for preventing reversal of current in the load circuit of an electric transmission system which includes an engine having a shaft, a load shaft, a motor connected in fixed speed relation with the engine shaft having an armature a field element and a field coil, a generator having an armature, a differential gearing connected with both shafts and with the generator armature, a load circuit including both armatures and the field coil in series circuit relation and means including a separate source of current for reversing the magnetization of the field element in response to a reduction of current in the load circuit to the point of threatened reversal.

35. Apparatus for transmitting power and means for stabilizing the apparatus including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, a separate source of current, and means including the separate source of current for aiding the residual magnetism in the field element of the second dynamo and opposing the residual magnetism in the field element of the first dynamo with a minor current from said source when load current ceases.

36. Apparatus for transmitting power and means for stabilizing the apparatus including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, a separate source of current, and means including the separate source of current for maintaining a slight magnetization in both field elements with a minor current from said source when load current ceases.

37. In a transmission system, the combination of a power shaft, a load shaft, a direct current dynamo connected with the power shaft and having armature and field pole windings, a second dynamo connected with the load shaft, a load circuit connecting the two dynamos including the armature and a series field coil on the first dynamo connected for motoring operation in the direction of power shaft rotation, means for shifting the brushes of the first dynamo so that the commutation zone passes under the pole piece and the operation of the said dynamo is effectively reversed, said field pole and armature windings being so proportioned that their magnetizing forces substantially neutralize each other in the commutating zone for all values of current in said load circuit and for all positions of said brushes.

38. In a transmission system, the combination of a power shaft, a load shaft, a direct current dynamo connected with the power shaft and having armature and field pole windings, a second dynamo connected with the load shaft, a load circuit connecting the two dynamos including said armature and field pole windings connected in series circuit relation, means for shifting the brushes of the first dynamo substantially through a polar angle, said armature winding being so connected and proportioned with respect to the field pole winding that its magnetizing force substantially neutralizes the magnetizing force of the field pole winding in the commutating zone throughout the brush shifting range, and means responsive to changes in the speed of one of the shafts for operating said brush shifting means in the direction of power shaft rotation for operation of the load shaft at a relatively low speed and for shifting said brushes in a direction opposite to the direction of the power shaft rotation for operation of the load shaft at a relatively high speed.

39. In combination, a variable speed power shaft, a variable speed load shaft, a reversible dynamo rotatively connected with both shafts, a second dynamo rotatively connected in fixed speed relation with the power shaft and having brushes adapted to be shifted through substantially a polar angle, a load circuit connecting said dynamos including the armature and a series field coil on said second dynamo, means for normally biasing the brushes of the second dynamo to motoring position, and means responsive to an increase in speed of one of the shafts and to a decrease in current in the load circuits for shifting the brushes towards the generating position, the series field and armature winding of said second dynamo being proportioned so that their magnetizing forces substantially neutralize each other in the commutating zone throughout the brush shifting range.

40. In combination, a variable speed power shaft, a variable speed load shaft, a reversible dynamo rotatively connected with both shafts, a second dynamo rotatively connected in fixed speed relation with the power shaft and having shiftable brushes, an electric load circuit including both dynamos, means for normally biasing the brushes of the second dynamo to motoring position, and means responsive to speed variations of one of the shafts for shifting the brushes of the second dynamo towards the generating position.

41. In combination, a variable speed power shaft, a variable speed load shaft, a reversible dynamo rotatively connected with both shafts, a second dynamo rotatively connected in fixed speed relation with the power shaft and having shiftable brushes, an electric load circuit including both dynamos, means for normally biasing the brushes of the second dynamo to motoring position, and means responsive to a decrease in load current for shifting the brushes towards the generating position.

42. In combination, a variable speed power shaft, a variable speed load shaft, a reversible dynamo rotatively connected with both shafts, a second dynamo rotatively connected in fixed speed relation with the power shaft and having shiftable brushes, an electric load circuit including both dynamos, means for normally biasing the brushes of the second dynamo to motoring position, and means responsive to an increase in speed of one of the shafts for shifting the brushes towards the generating position.

43. In combination, a variable speed power shaft, a variable speed load shaft, a reversible dynamo rotatively connected with both shafts, a second dynamo rotatively connected in fixed speed relation with the power shaft and having shiftable brushes, an electric load circuit including both dynamos, means for normally biasing the brushes of the second dynamo to motoring position, and means responsive to an increase in speed of one of the shafts and to a decrease in current of the load circuit for shifting the brushes towards the generating position.

44. In combination, an engine having a bell housing and a shaft, a load shaft, a field system secured to the bell housing, a hollow armature secured to the engine shaft and arranged within the field system to form a gear case, a second armature arranged within the field system and adjacent to the gear case, a gearing arranged within the gear case operative to connect the engine shaft with the load shaft and with the second armature, and means for varying the speed of one armature with respect to the other armature for variously driving the load shaft.

45. In combination, an engine having a shaft, a load shaft, an engine gear operatively connected with the engine shaft, a hollow armature operatively connected with the engine gear and with the engine shaft arranged to surround the engine gear and to form a gear case, a sleeve provided with a gear extending into the gear case, a second armature secured to the sleeve, a bearing for aligning the sleeve with the gear case, a field element for said armatures having a bearing intermediate between the armatures for aligning the armatures with the field element, a bearing between the gear case and the load shaft, means for aligning the free end of the sleeve and of the load shaft with the field element, a loosely journaled load gear carried by the load shaft and meshing with said gears, and an electric circuit including said armatures.

46. The means for driving a load in forward and reverse directions which includes an engine having a shaft, a load shaft, a dynamo rotatively connected with both shafts having armature and field elements, a second dynamo rotatively connected with the engine shaft including a field element independent of the first dynamo and an armature having a substantially superior power capacity with respect to the armature of the first dynamo, field coils for energizing the field elements from one of the dynamos, connections for developing power in the second dynamo substantially superior to that developed in the first dynamo for operation of load shaft in reverse direction with respect to engine shaft, and means for reversing the armatures of both dynamos with respect to their field coils and for developing power in the second dynamo substantially inferior to that in the first dynamo for operation of the load shaft in a forward direction with respect to engine shaft.

47. The means for driving a load in forward and reverse directions which includes an engine having a shaft, a load shaft, gearing interposed between the shafts, a dynamo rotatively connected with the gearing having armature and field elements, a second dynamo rotatively connected with the engine shaft having armature and field elements independent of the first dynamo and of substantially superior power capacity with respect to the power capacity of the first dynamo, a plurality of field coils for energizing the field elements from one of the dynamos, connections for developing power in the second dynamo substantially superior to that developed in the first dynamo for operation of load shaft in reverse direction with respect to engine shaft, and means for reversing the armatures of both dynamos with respect to their field coils and for developing power in the second dynamo substantially inferior to that in the first dynamo for operation of the load shaft in a forward direction with respect to engine shaft.

48. The means for driving a load at speeds less than that of an engine in one stage and at speeds exceeding that of an engine in another stage which includes an engine having a shaft, a load shaft, differential gearing interposed between the shafts, a dynamo rotatively connected with the gearing having armature and field elements, a second dynamo rotatively connected with the engine shaft having armature and field elements independent of the first dynamo, and of substantially superior power capacity with respect to the power capacity of the first dynamo, means for magnetizing the field element of first dynamo from one of the dynamos substantially in accordance with the load on the load shaft, and means for variously operating the second dynamo as a weak motor in the first stage and as a weak generator in the second stage to drive load shaft below the speed of engine shaft and as a strong generator in the third stage to drive load shaft substantially above the speed of the engine shaft.

49. The means for driving a load in forward and reverse directions which includes an engine having a shaft, a load shaft, gearing interposed between the shafts, a dynamo rotatively connected with the gearing having armature and field elements, a second dynamo rotatively connected in fixed speed relation with the engine shaft having armature and field elements independent of the first dynamo and of substantially superior power capacity with respect to the power capacity of the first dynamo, a plurality of field coils for energizing the field elements from one of the dynamos, connections for developing power in the second dynamo substantially superior to that developed in the first dynamo for operation of load shaft in reverse direction with respect to engine shaft, and means for reversing the armatures of both dynamos with respect to their field coils and for developing power in the second dynamo substantially inferior to that in the first dynamo for operation of the load shaft in a forward direction with respect to engine shaft.

50. A system for transmitting power between a power member and a load member, said system including a power member, a plurality of separate dynamo electric machines, means for simultaneously driving said machines from said power member, a load circuit connecting said dynamo machines, one of said machines being physically larger than the other and having a field coil connected in series with said circuit in motoring direction for rendering said transmission system inoperative.

51. A system for transmitting power including a power member, a load member, two separate dynamos, one of said dynamos being physically larger and of greater torque capacity than the other, the large dynamo being connected in fixed speed relation with said power member, the other dynamo being connected by differential gearing in variable speed relation with both members, a circuit for driving the small dynamo as a motor from the large dynamo, a regulator responsive to speed variations of one of said members and operable to control the power output of the large dynamo to drive the load member at speeds below the speed of the power member in one stage of operation and at speeds in excess of the power member in another stage.

52. Apparatus for transmitting power from a load to an engine for braking the load by engine friction including a load member, an engine having a member, a dynamo rotatively connected by differential gearing with both members, means for causing said dynamo to operate as a generator driven by said load member, a separate dynamo physically substantially larger than said first mentioned dynamo and rotatively connected with said engine member, and means for driving said larger dynamo as a motor in the direction of engine rotation with current from said first mentioned dynamo.

53. Apparatus for transmitting power and means for stabilizing the apparatus including an engine member, a load member, a dynamo connected in fixed speed relation with the engine member having a field element an armature and a field coil, a second dynamo having a field element an armature and a field coil, a differential gearing connecting the second dynamo in variable speed relation with the engine and load members, an electric load circuit including both armatures and both field coils, all connected in series circuit relation, a separate source of current, and means including the separate source of current for maintaining a slight magnetization in both field elements with a minor current from said source when load current ceases.

54. In combination, a variable speed power shaft, a variable speed load shaft, a dynamo coupled with the load shaft, a second dynamo rotatively connected in fixed speed relation with the power shaft and having shiftable brushes, an electric load circuit including both dynamos, means for normally biasing the brushes of the second dynamo to motoring position, and means responsive to speed variations of one of the shafts for shifting the brushes of the second dynamo into generating position.

55. In combination, a variable speed power shaft, a variable speed load shaft, a dynamo coupled with the load shaft, a second dynamo rotatively connected in fixed speed relation with the power shaft and having shiftable brushes, an electric load circuit including both dynamos, means for normally biasing the brushes of the second dynamo to motoring position, means responsive to speed variations of one of the shafts for shifting the brushes of the second dynamo towards the generating position, and means responsive to current in said load circuit for opposing the shifting of said brushes.

56. In combination, a variable speed power shaft, a variable speed load shaft, a dynamo coupled with the load shaft, a second dynamo rotatively connected in fixed speed relation with the power shaft and having shiftable brushes, an electric load circuit including both dynamos, means for normally biasing the brushes of the second dynamo to motoring position, means responsive to speed variations of one of the shafts for shifting the brushes of the second dynamo into generating position, and means for at will changing the standard of operation of said brush shifting means.

57. In combination, a variable speed power shaft, a variable speed load shaft, a dynamo coupled with the load shaft, a second dynamo rotatively connected in fixed speed relation with the power shaft and having shiftable brushes, an electric load circuit including both dynamos, means for normally biasing the brushes of the second dynamo to motoring position, means responsive to speed variations of one of the shafts for shifting the brushes of the second dynamo towards the generating position, means responsive to current in said load circuit for opposing the shifting of said brushes, and means for at will changing the standard of operation of said brush shifting means.

58. In apparatus of the class described, the combination of a driving shaft, a driven shaft, an electrical transmission for transmitting power from the driving shaft to the driven shaft, said transmission comprising a pair of electrically and mechanically connected dynamo-electric machines one of which is provided with shiftable brushes whereby said machine may be caused to act as a motor or as a generator, means biasing said brushes to motor position, an auxiliary motor for shifting the brushes, means responsive to the speed of one of said shafts for impressing a variable voltage on the auxiliary motor to shift the brushes into generator position, and independently actuatable means for controlling the operation of said auxiliary motor.

59. In combination, a power shaft, a load shaft, a dynamo driven by the power shaft and having shiftable brushes, a second dynamo coupled with the load shaft and having shiftable brushes, a load circuit connecting said dynamos, means for normally biasing the brushes of the first dynamo to motoring position to prevent transmission of power from the power shaft to the load shaft, means for normally biasing the brushes of the second dynamo to motoring position, means for shifting the brushes of the first dynamo into generator position to transmit power from the power shaft to the load shaft, and means for shifting the brushes of the second dynamo into a position for generator operation when driven by the load shaft to transmit power in the reverse direction.

60. In combination, a variable speed power shaft, a load shaft, a dynamo connected in fixed speed relation with the power shaft and having shiftable brushes, a second dynamo coupled by differential gearing with both the power shaft and the load shaft and having shiftable brushes, a load circuit connecting said dynamos, means for normally biasing the brushes of the first dynamo to motoring position, means for normally biasing the brushes of the second dynamo to motoring position, means responsive to speed variations of the engine shaft for shifting the brushes of the first dynamo into generator position to transmit power from the power shaft to the load shaft, means for shifting the brushes of the second dynamo to a position for generator operation when driven by the load shaft to transmit power in the reverse direction, and means for at will changing the standard of operation of said brush shifting means.

61. In combination, a variable speed power shaft, a load shaft, a dynamo connected in fixed speed relation with the power shaft and having shiftable brushes, a second dynamo coupled by differential gearing with both the power shaft and the load shaft and having shiftable brushes, a load circuit connecting said dynamos, means for normally biasing the brushes of the first dynamo to motoring position, means for normally biasing the brushes of the second dynamo to motoring position, means responsive to speed variations of the engine shaft for shifting the brushes of the first dynamo into generator position to transmit power from the power shaft to the load shaft, means responsive to current variations in said load circuit for modifying the action of said speed responsive means, means for shifting the brushes of the second dynamo into a position for generator operation when driven by the load shaft to transmit power in the reverse direction, and means for at will changing the standard of operation of said brush shifting means.

62. In combination, a variable speed power shaft, a variable speed load shaft, a dynamo coupled with the load shaft, a second dynamo rotatively connected in fixed speed relation with the power shaft and having shiftable brushes, an electric load circuit including both dynamos, means for normally biasing the brushes of the second dynamo to non-generating position, and means responsive to speed variations of the power shaft for shifting the brushes of the second dynamo into generating position.

63. In combination, a variable speed power shaft, a variable speed load shaft, a dynamo coupled with the load shaft, a second dynamo rotatively connected in fixed speed relation with the power shaft and having shiftable brushes, an electric load circuit including both dynamos, means for normally biasing the brushes of the second dynamo to non-generating position, yieldable means for shifting the brushes of the second dynamo into generating position, and means responsive to current in said load circuit for opposing the shifting of said brushes.

64. In combination, a variable speed power shaft, a variable speed load shaft, a dynamo coupled with both the power shaft and the load shaft, a second dynamo rotatively connected in fixed speed relation with the power shaft and having shiftable brushes, an electric load circuit including both dynamos, means for normally biasing the brushes of the second dynamo to motoring position, yieldable means for shifting the brushes of the second dynamo into generating position, and means responsive to current in said load circuit for opposing the shifting of said brushes.

65. In a transmission system, the combination of a differential gearing having three rotary elements, a variable speed power shaft connected to one rotary element, a load shaft connected to another rotary element, a power machine having a reversible rotor connected to the third rotary element, a second power machine having a rotor connected in fixed speed relation with the power shaft, a power transmission circuit connecting said power machines, means for reversing the function of the second power machine to either absorb power from or deliver power to the first machine, means for normally biasing the reversing means to a position where the second machine absorbs the output of the first machine and operates as a motor in the direction of power shaft rotation, and means responsive to increase in the speed of one of said shafts for operating said reversing means to a position where the second machine delivers power to the first machine and reverses the direction of rotation thereof.

66. In a transmission system, the combination of a differential gearing having three rotary elements, a variable speed power shaft connected to one rotary element, a load shaft connected to another rotary element, a power machine having a reversible rotor connected to the third rotary element, a second power machine having a rotor connected in fixed speed relation with the power shaft, a power transmission circuit connecting said power machines, means for reversing the function of the second power machine to either absorb power from or deliver power to the first machine, means for normally biasing the reversing means to a position where the second machine absorbs the output of the first machine and operates as a motor in the direction of power shaft rotation, and means responsive to increasing speed of the power shaft for operating said reversing means to first decrease the motoring action of the second machine to zero and then increase the power generating action of the second machine, whereby for low speeds of the power shaft the first machine acts as a power generator to drive the second machine and for higher speeds of the power shaft the second machine acts as a power generator and reverses the direction of rotation of the first machine.

ALFONS H. NEULAND.

CERTIFICATE OF CORRECTION.

Patent No. 2,045,197. June 23, 1936.

ALFONS H. NEULAND.

It is hereby certified that error appears in the printed specification of the above numbered patent requiring correction as follows: Page 7, first column, line 51, claim 8, strike out the words "in fixed speed relation" and insert the same after "connected" in line 52, same claim; and that the said Letters Patent should be read with this correction therein that the same may conform to the record of the case in the Patent Office.

Signed and sealed this 22nd day of September, A. D. 1936.

Henry Van Arsdale (Seal) Acting Commissioner of Patents.